(12) United States Patent
Guyer

(10) Patent No.: US 8,387,351 B2
(45) Date of Patent: Mar. 5, 2013

(54) HARVESTER HEADER BAT REEL ASSEMBLY TENSIONING MEMBER

(76) Inventor: Wayne A. Guyer, Wabash, IN (US)

( * ) Notice: Subject to any disclaimer, the term of this patent is extended or adjusted under 35 U.S.C. 154(b) by 16 days.

(21) Appl. No.: 13/017,795

(22) Filed: Jan. 31, 2011

(65) Prior Publication Data
US 2011/0185695 A1 Aug. 4, 2011

Related U.S. Application Data

(60) Provisional application No. 61/301,361, filed on Feb. 4, 2010.

(51) Int. Cl.
*B62D 61/12* (2006.01)
*B62K 13/00* (2006.01)
(52) U.S. Cl. .................................................. 56/226
(58) Field of Classification Search ............... 56/226, 56/220, 224, 14.4, 364, 327.1, 128, 12.4; 460/142, 121, 122
See application file for complete search history.

(56) References Cited

U.S. PATENT DOCUMENTS

| | | | | |
|---|---|---|---|---|
| 2,694,894 A | * | 11/1954 | Linscheid | 56/226 |
| 3,302,378 A | * | 2/1967 | Rasmussen | 56/328.1 |
| 4,008,558 A | * | 2/1977 | Mott | 56/226 |
| 4,098,061 A | * | 7/1978 | Spiker | 56/124 |
| 4,459,797 A | * | 7/1984 | Gessel et al. | 56/220 |
| 4,776,155 A | * | 10/1988 | Fox et al. | 56/220 |
| 5,007,235 A | * | 4/1991 | Nickel et al. | 56/12.4 |
| 5,768,870 A | * | 6/1998 | Talbot et al. | 56/364 |
| 5,987,861 A | * | 11/1999 | Duncan et al. | 56/14.4 |
| 6,170,244 B1 | * | 1/2001 | Coers et al. | 56/226 |
| 6,453,655 B2 | * | 9/2002 | Ferraris | 56/220 |
| 6,698,175 B1 | | 3/2004 | Schumacher et al. | |
| 6,708,475 B2 | | 3/2004 | Guyer | |
| 7,757,470 B2 | | 7/2010 | Schumacher et al. | |

* cited by examiner

*Primary Examiner* — Arpad Fabian-Kovacs
(74) *Attorney, Agent, or Firm* — Taylor IP, P.C.

(57) ABSTRACT

A harvesting machine having a ground contacting propulsion system, a chassis connected to the ground propulsion system, and a header. The header has a bat reel assembly rotatingly attached to the header. The bat reel assembly includes at least one reel structural assembly, a plurality of bat rods, a tensioned member, and at least one moveable pivotal member. The at least one reel structural assembly is configured to rotate about an axis. The plurality of bat rods are pivotally connected to the at least one reel structural assembly. The plurality of bat rods include a first bat rod and a second bat rod. The tensioned member is drivingly coupled to the first bat rod and the second bat rod. The at least one pivotal member is in contact with the tensioned member. The at least one moveable pivotal member is located between the first bat rod and the second bat rod along a path of the tensioned member.

20 Claims, 3 Drawing Sheets

HARVESTER HEADER BAT REEL ASSEMBLY TENSIONING MEMBER

CROSS REFERENCE TO RELATED APPLICATIONS

This is a non-provisional application based upon U.S. provisional patent application Ser. No. 61/301,361, entitled "Harvester Header," filed Feb. 4, 2010, which is incorporated herein by reference.

BACKGROUND OF THE INVENTION

1. Field of the Invention

The present invention relates to a harvester, and, more particularly, to a bat drive system associated with a reel of a header of the harvester.

2. Description of the Related Art

Combines, also known as harvesters, are commonly used by farmers all over the world to harvest their crops. Various varieties of grains, kernels, and beans that range in height from a couple of inches to several feet above the ground, are cut by the header and fed into the combine. Combines, which are designed to harvest these crops, have a floating header pivotally connected to the combine in front of a feed auger. Mounted over the header is a plurality of elongated bats arranged circumferentially spaced apart in parallel fashion to define a reel, which rotates as the combine moves along the field to harvest the crop. Each of the bats of the reel assembly have a plurality of spaced apart fingers, which rake through the crop, and present a crop to the cutter on the leading edge of the header and helps to feeds the cut crop into the auger of the combine. Depending upon the crop size, the moisture of the crop, and the cutting conditions, feeding the crop into the auger may present problems.

The inventor has previously patented, in U.S. Pat. No. 6,708,475, a drive system for combine reel bats, which solve many problems in the gathering of crop material into the header of the combine.

What is needed in the art is a reel bat drive system that is easily adjustable.

SUMMARY OF THE INVENTION

The present invention relates to a reel bat drive for use in a harvester.

The invention comprises, in one form thereof, a harvesting machine having a ground contacting propulsion system, a chassis connected to the ground propulsion system, and a header. The header has a bat reel assembly rotatingly attached to the header. The bat reel assembly includes at least one reel structural assembly, a plurality of bat rods, a tensioned member, and at least one moveable pivotal member. The at least one reel structural assembly is configured to rotate about an axis. The plurality of bat rods are pivotally connected to the at least one reel structural assembly. The plurality of bat rods include a first bat rod and a second bat rod. The tensioned member is drivingly coupled to the first bat rod and the second bat rod. The at least one pivotal member is in contact with the tensioned member. The at least one moveable pivotal member is located between the first bat rod and the second bat rod along a path of the tensioned member.

The invention comprises, in another form thereof, a bat reel assembly for use with a harvester, the bat reel assembly includes at least one reel structural assembly, a plurality of bat rods, a tensioned member, and at least one moveable pivotal member. The at least one reel structural assembly is configured to rotate about an axis. The plurality of bat rods are pivotally connected to the at least one reel structural assembly. The plurality of bat rods include a first bat rod and a second bat rod. The tensioned member is drivingly coupled to the first bat rod and the second bat rod. The at least one pivotal member is in contact with the tensioned member. The at least one moveable pivotal member is located between the first bat rod and the second bat rod along a path of the tensioned member.

An advantage of the present invention is that the tensioned member adjusts the drive path for each of the bat rods.

Another advantage of the present invention is that only one tensioned member is utilized to drive all six bats, although each bat is individually driven.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
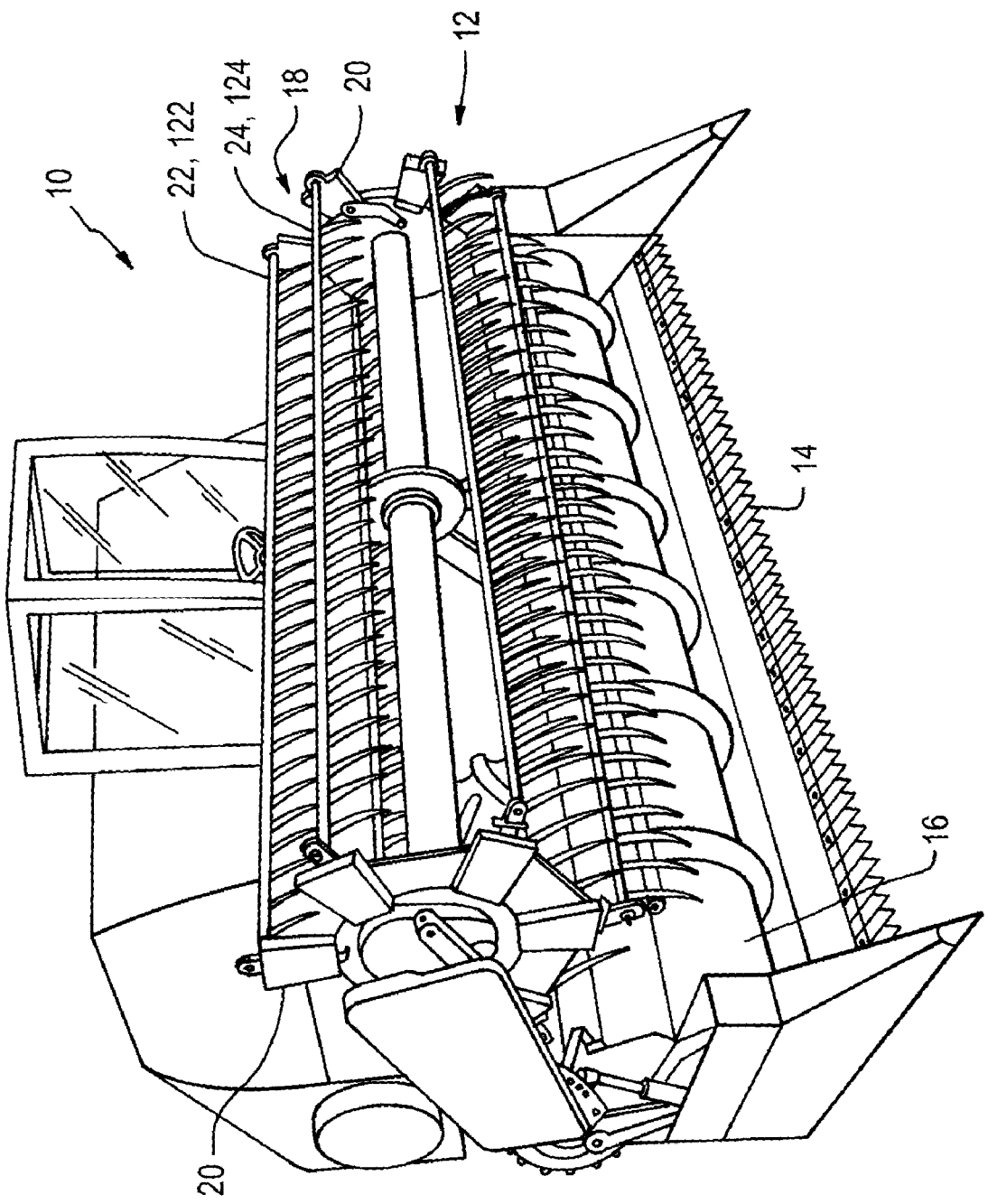
FIG. 1 is a perspective view of a harvester utilizing an embodiment of the present invention attached thereto.
Figure 2:
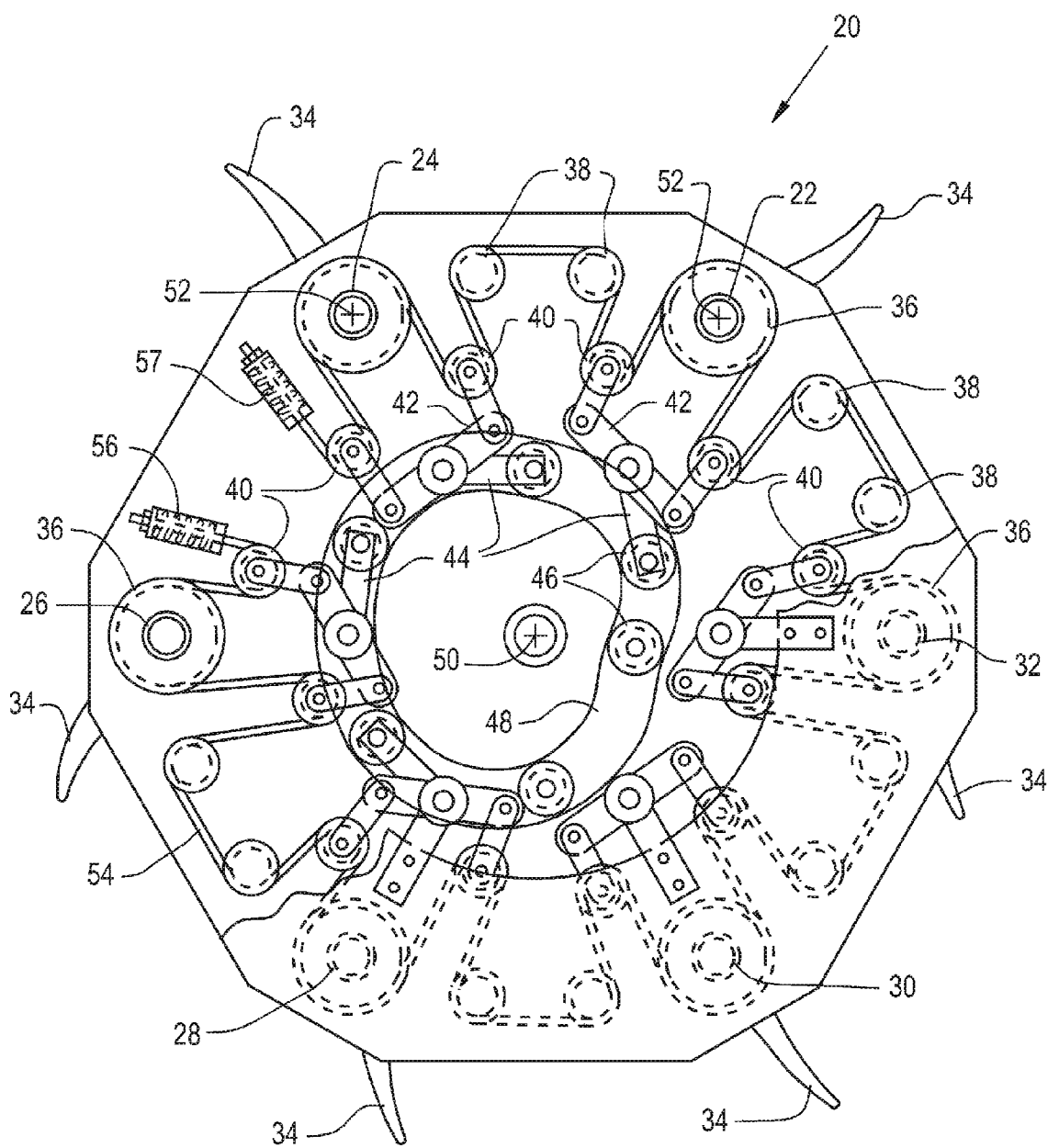
FIG. 2 is a partially sectioned schematical view of an embodiment of a bat drive system of the present invention.
Figure 3:
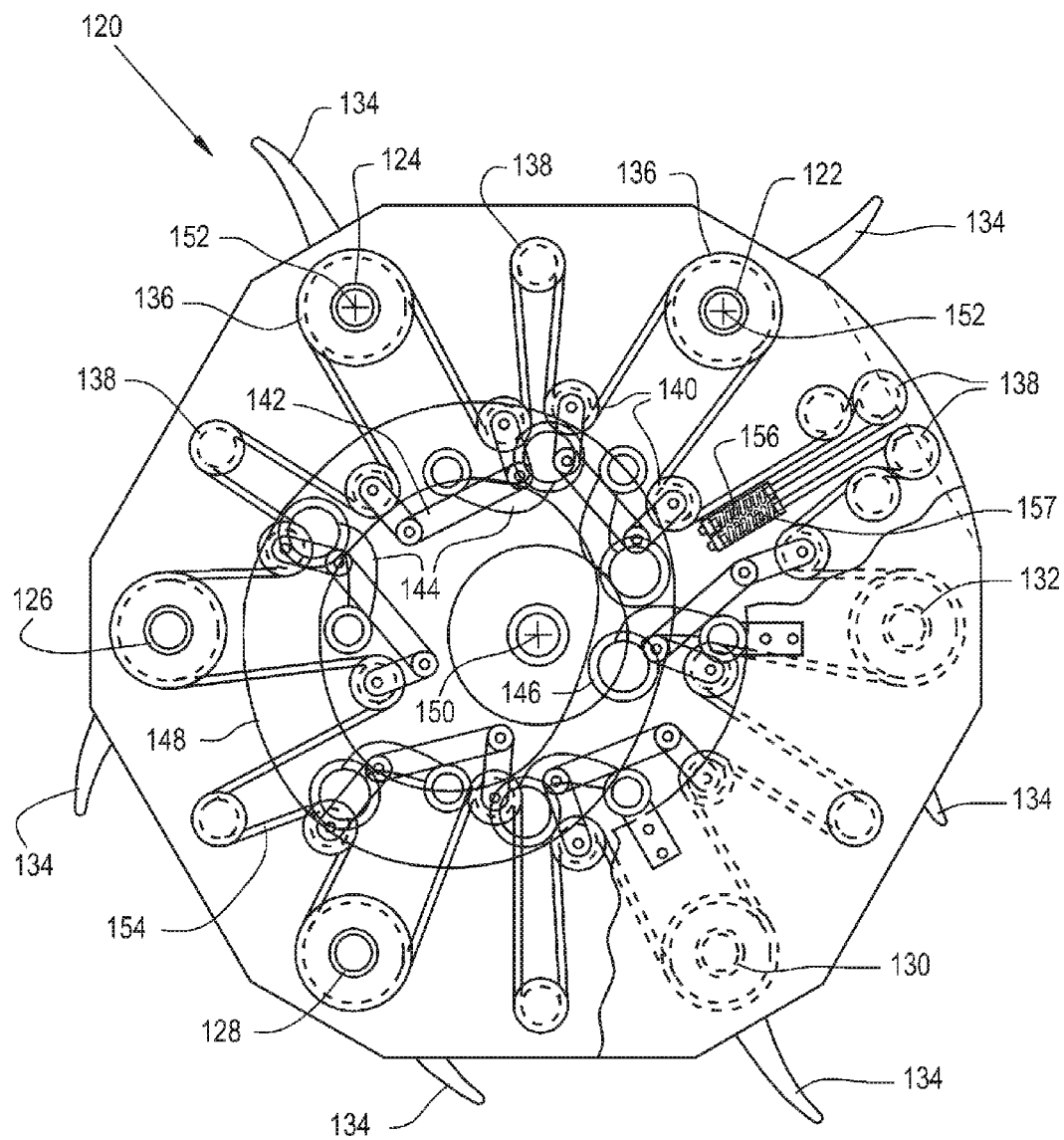
FIG. 3 is another partially sectioned schematically illustrated view of another embodiment of a bat drive system.

Referring now to the drawings, and more particularly to FIGS. 1-3, there is shown a harvester 10 having a header 12, a cutterbar 14, an auger 16, and a reel 18. Header 12 is pivotally connected to harvester 10, having a cutterbar 14 and a forward leading edge, which cuts the stalk of the crop and auger 16 moves the crop to a processing portion (not illustrated) within harvester 10. Reel 18 may be pivotally connected to header 12 or may be directly connected to header 12. Reel 18 extends over the top of the crop as it's being moved towards cutterbar 14 to provide for efficient cutting of the crop stalk as the crop is moved by reel 18.

Reel 18 includes a reel structural assembly 20, which may be located at either one or both ends of reel 18 and may even have a section located between the distal ends of reel 18. Reel structural assembly 20 may also be understood to be a drive mechanism that utilizes the motion of reel 18 to provide controlled positioning of bat rods 22, 24, 26, 28, 30, and 32. Bat fingers 34 extend from each of bat rods 22-32 and the orientation of bat fingers 34 are determined by the relative rotational position of bat rods 22-32.

Now, more particularly, referring to FIG. 2, there is illustrated a reel structural assembly 20 having bat rods 22-32 equally spaced therearound. Bat fingers 34 can be seen to have different positions relative to reel structural assembly 20 depending upon their position as reel structural assembly 20 rotates. Reel structural assembly 20 includes drive sprockets 36 connected directly to bat rods 22-32. Idler sprockets 38 and movable sprockets 40 each interact with a tensioned member 54, which may be in the form of a chain 54. Idler sprockets 38 are connected in a pivotal manner to reel structural assembly 20 and may have limited rotational movement during the operation of reel structural assembly 20. In contrast thereto, movable sprockets 40 rotate and move as controlled by their connection to a support arm 42 that is pivotally connected to reel structural assembly 20 having a lever arm 44 extending therefrom. Movable sprockets 40 and support arm 42 that are connected are collectively a movable pivotal member. A roller 46 is rotationally connected to lever arm 44 and serves to position both lever arm 44 and support arm 42 as roller 46 follows a roller route 48. Roller route 48 may be considered to be a cam route and is not rotationally moved while reel structural assembly 20 does rotate. Roller route 48 can be affixed to header 12 or to some other portion of reel 18 in such a manner that roller route 48 is substantially in a fixed position. It is also contemplated that roller route 48 may be itself pivoted to some amount to reconfigure the positioning of bat fingers 34 as reel 18 rotates. Reel structural assembly rotates about an axis 50 while bat rods 22-32 each pivot about a separate bat axis 52. Drive sprockets 36 are moved by the relative positioning of support arm 42 as it is repositioned by the action of roller 36 as it moves along roller route 48. Moveable sprockets 40 are repositioned along tensioned member 54 causing drive sprockets 36 to react to the repositioning of moveable sprockets 40. This allows roller route 48 to determine the position of bat finger 34 as reel structural assembly 20 rotates about axis 50.

As can be seen in FIG. 2, lever arms 44 have been omitted from two of the bat rods sections to provide clarity in the figure and to also illustrate the repositioning of rollers 46 along roller route 48. In FIG. 2, reel structural assembly 20 would rotate in a counterclockwise direction, causing rollers 46 to roll along roller route 48 in a counterclockwise direction, causing the support arms 42 to follow the positioning of rollers 46 to thereby drive moveable sprockets 40 as they serve to reposition bat fingers 34 on each of bat rods 22-32. Also illustrated are tensioning devices 56, which can be individually tensioned to thereby allow for a quick tensioning of the entire tensioned member 54 and the entire reel structural assembly 20. Advantageously, tensioning device 56, which maintains a substantially constant spring tension on tensioned member 54. Adjuster 57 adjusts the bias and/or pitch of bat fingers 34 in one direction, or the other, depending on how tensioning device 56 is tensioned by adjuster 57. As can be seen, tensioned member 54 basically has only movement between movable sprockets 40 and drive sprockets 36 of each bat rod section during operation.

Now, additionally referring to FIG. 3, there is illustrated another embodiment of reel structural assembly 120 with items of the previous embodiment having similar elements numbered with "100" added thereto. In this embodiment, lever arms 144 are curved and provide a rotating roller 146 on one end, pivoting point on the other end where support arms 142 are connected thereto. Here, approximately one half as many idler sprockets 138 are utilized and tensioning device 156 may be utilized to tension an end of tensioned member 154 while adjuster 157 can be adjusted to alter the pitch of bat fingers 134 for the purposed of timing the movement of bat fingers 134. Tensioning device 156 may be in the form of an adjustable biasing device or may be spring loaded or may be a combination of both to provide a uniform tensioning of tensioned member 154.

Reel structural assemblies 20 and 120 are both advantageously configured so that roller route 48 and 148 determine the positioning of bat fingers 34 and 134. This allows for clearing of the crop material from bat fingers 34 as the crop material approaches the auger 16 and additionally allows for aggressive picking up of crop material when bat fingers 34 are encountering the crop material. It is to be recognized that the actual positioning of bat fingers 34 and 134, in FIGS. 2 and 3, are for illustrative purposes, and may not be the actual positioning of bat fingers 34 and 134 when configured for use. Also, just as sprockets 36, 38, 40, 136, 138, and 140 are each described as sprockets that would have teeth to interact with a chain 54 and 154, it is also recognized that other types of tensioned members 54, 154, and sprockets may be utilized. The initial positioning of each drive sprocket 36, 136 relative to tensioned member 54, 154 allows for initial position setups while roller route 48 and 148 provide for the relative motion of bat fingers 34, 134 during the rotation of reel 18.

In FIG. 3, brackets are shown holding two of the pivoting portions of lever arm 44, which is not shown for the rest of the assembly for the sake of clarity. Additionally, although lines are shown crossing others, this is intentional for the sake of clarity and the schematical representation of the present invention. Since bat rods 22-32 move back and forth rather than rotating around in a continuous rotation, the wrapping of crop material about bat rods 22-32 is effectively avoided. Also, the back and forth movement of bat fingers 34 help to dislodge any material that may become entangled on fingers 34.

Further, it is contemplated that lever arms 44 and 144 can be repositioned relative to support arms 42 and 142 respectively so that the angular position of bat fingers 34 and 134 can be thus adjusted. It is also contemplated that idler sprockets 38 and 138 may be repositioned to also vary the action of bat rods 22-32 and 122-132.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A harvesting machine, comprising:
a ground contacting propulsion system;
a chassis connected to said ground propulsion system; and
a header having a bat reel assembly rotatingly attached to said header, said bat reel assembly including:
at least one reel structural assembly configured to rotate about an axis;
a plurality of bat rods pivotally connected to said at least one reel structural assembly, said plurality of bat rods including a first bat rod and a second bat rod;
a tensioned member drivingly coupled to said first bat rod and said second bat rod, said tensioned member having two ends, at least one of said two ends being adjustably connected to said reel structural assembly; and
at least one movable pivotal member in contact with said tensioned member, said at least one movable pivotal member being located between said first bat rod and said second bat rod along a path of said tensioned member.

2. The harvester of claim 1, wherein said bat reel assembly additionally includes:
at least one lever arm; and
a roller coupled to said lever arm, said lever arm being coupled to said at least one movable pivotal member.

3. The harvester of claim 2, wherein said bat reel additionally includes a roller route having a predefined contour in which said roller travels as said reel structural assembly rotates.

4. The harvester of claim 3, wherein said at least one movable pivotal member includes a first movable pivotal member and a second movable pivotal member associated with each of said at least one lever arm.

5. The harvester of claim 4, wherein said at least one lever arm is a plurality of lever arms each individually corresponding to one of said bat rods.

6. The harvester of claim 1, wherein said tensioned member is drivingly coupled to each of said plurality of bat rods, said two ends both being adjustably connected to said reel structural assembly.

7. The harvester of claim 6, wherein said at least one movable pivotal member is a plurality of movable pivotal members with at least two of said movable pivotal members being located along said path of said tensioned member between each of said bat rods.

8. The harvester of claim 7, wherein said at least one lever arm is a plurality of lever arms, each of said lever arms associated with two of said movable pivotal members one on each side of each bat rod along said path of said tensioned member.

9. The harvester of claim 8, wherein said bat reel assembly further comprises a plurality of rollers a corresponding one of said plurality of rollers being coupled to a corresponding one of said lever arms.

10. The harvester of claim 9, wherein said bat reel additionally includes a roller route having a predefined path in which said plurality of rollers travel as said reel structural assembly rotates.

11. A bat reel assembly for use with an agricultural harvester, comprising:
    at least one reel structural assembly configured to rotate about an axis;
    a plurality of bat rods pivotally connected to said at least one reel structural assembly, said plurality of bat rods including a first bat rod and a second bat rod;
    a tensioned member drivingly coupled to said first bat rod and said second bat rod, said tensioned member having two ends, at least one of said two ends being adjustably connected to said reel structural assembly; and
    at least one movable pivotal member in contact with said tensioned member, said at least one movable pivotal member being located between said first bat rod and said second bat rod along a path of said tensioned member.

12. The bat reel assembly of claim 11, further comprising:
    at least one lever arm; and
    a roller coupled to said lever arm, said lever arm being coupled to said at least one movable pivotal member.

13. The bat reel assembly of claim 12, further comprising a roller route having a predefined contour in which said roller travels as said reel structural assembly rotates.

14. The bat reel assembly of claim 13, wherein said at least one movable pivotal member includes a first movable pivotal member and a second movable pivotal member associated with each of said at least one lever arm.

15. The bat reel assembly of claim 14, wherein said at least one lever arm is a plurality of lever arms each individually corresponding to one of said bat rods.

16. The bat reel assembly of claim 11, wherein said tensioned member is drivingly coupled to each of said plurality of bat rods, said two ends both being adjustably connected to said reel structural assembly.

17. The bat reel assembly of claim 16, wherein said at least one movable pivotal member is a plurality of movable pivotal members with at least two of said movable pivotal members being located along said path of said tensioned member between each of said bat rods.

18. The bat reel assembly of claim 17, wherein said at least one lever arm is a plurality of lever arms, each of said lever arms associated with two of said movable pivotal members one on each side of each bat rod along said path of said tensioned member.

19. The bat reel assembly of claim 18, further comprising a plurality of rollers a corresponding one of said plurality of rollers being coupled to a corresponding one of said lever arms.

20. The bat reel assembly of claim 19, further comprising a roller route having a predefined path in which said plurality of rollers travel as said reel structural assembly rotates.

* * * * *